United States Patent
Salter et al.

(10) Patent No.: US 10,281,990 B2
(45) Date of Patent: May 7, 2019

(54) VEHICLE USER INPUT CONTROL SYSTEM AND METHOD

(71) Applicant: Ford Global Technologies, LLC, Dearborn, MI (US)

(72) Inventors: Stuart C. Salter, White Lake, MI (US); James J. Surman, Clinton Township, MI (US); Annette Lynn Huebner, White Lake, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 15/371,654

(22) Filed: Dec. 7, 2016

(65) Prior Publication Data

US 2018/0157329 A1  Jun. 7, 2018

(51) Int. Cl.
*G06F 3/044* (2006.01)
*G06F 3/01* (2006.01)
*G06F 3/041* (2006.01)

(52) U.S. Cl.
CPC ............ *G06F 3/017* (2013.01); *G06F 3/0416* (2013.01); *G06F 3/044* (2013.01); *G06F 2203/04108* (2013.01)

(58) Field of Classification Search
CPC .................................. G06F 3/017; G06F 3/044
See application file for complete search history.

(56) References Cited

U.S. PATENT DOCUMENTS

| | | | |
|---|---|---|---|
| 6,668,221 B2 | 12/2003 | Harter, Jr. et al. | |
| 7,239,947 B2 | 7/2007 | Suzuki | |
| 7,957,864 B2 * | 6/2011 | Lenneman | B60K 37/06 340/425.5 |
| 8,099,210 B2 | 1/2012 | Lenneman et al. | |
| 2004/0158374 A1 * | 8/2004 | Suzuki | G01C 21/3664 701/36 |
| 2011/0082616 A1 * | 4/2011 | Small | B60K 35/00 701/31.4 |
| 2013/0275899 A1 * | 10/2013 | Schubert | G06F 3/0481 715/765 |
| 2016/0016473 A1 | 1/2016 | Van Wiemeersch et al. | |

* cited by examiner

*Primary Examiner* — Anil K Bhargava
(74) *Attorney, Agent, or Firm* — Vichit Chea; Price Heneveld LLP

(57) ABSTRACT

A vehicle user input control system and method is provided having a user input located on a vehicle, a plurality of proximity sensors located proximate the user input, and a controller processing signals generated by the proximity sensors to detect at least one of a trajectory and orientation of a hand proximate to the user input and determining the hand is associated with one of a driver and passenger of the vehicle.

17 Claims, 11 Drawing Sheets

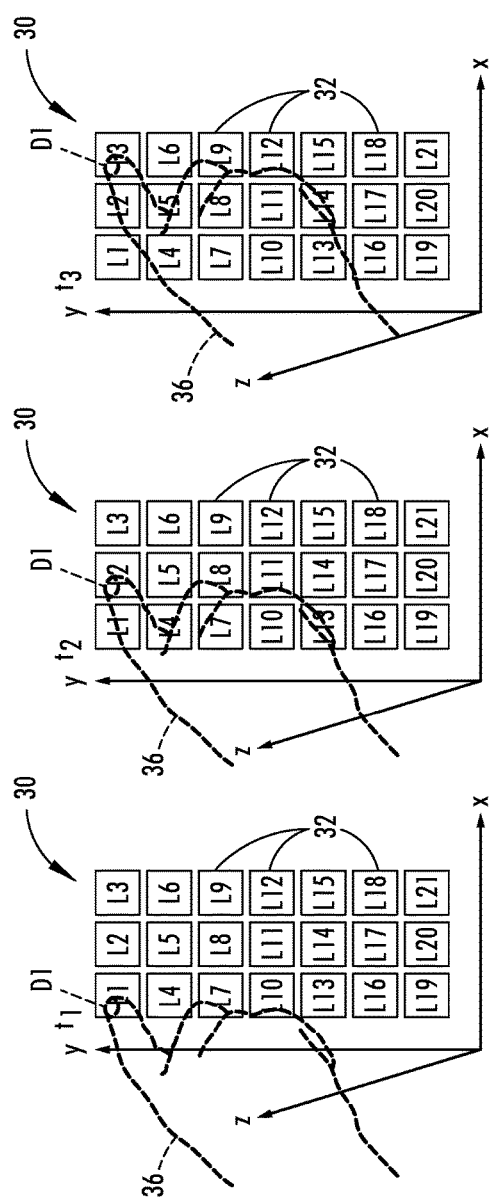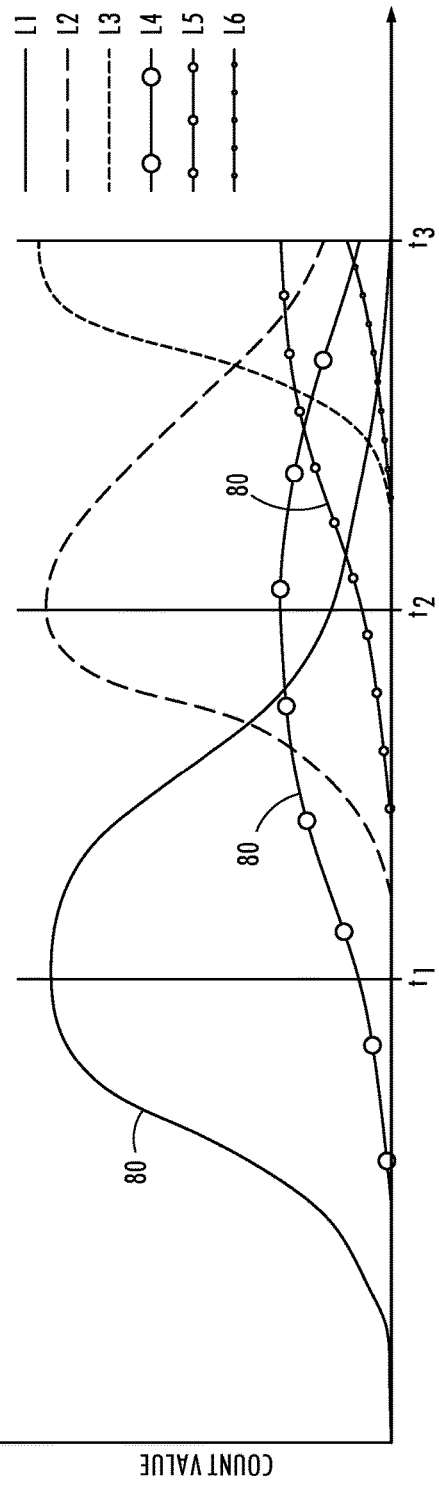
FIG. 10A
FIG. 10B
FIG. 10C
FIG. 10D

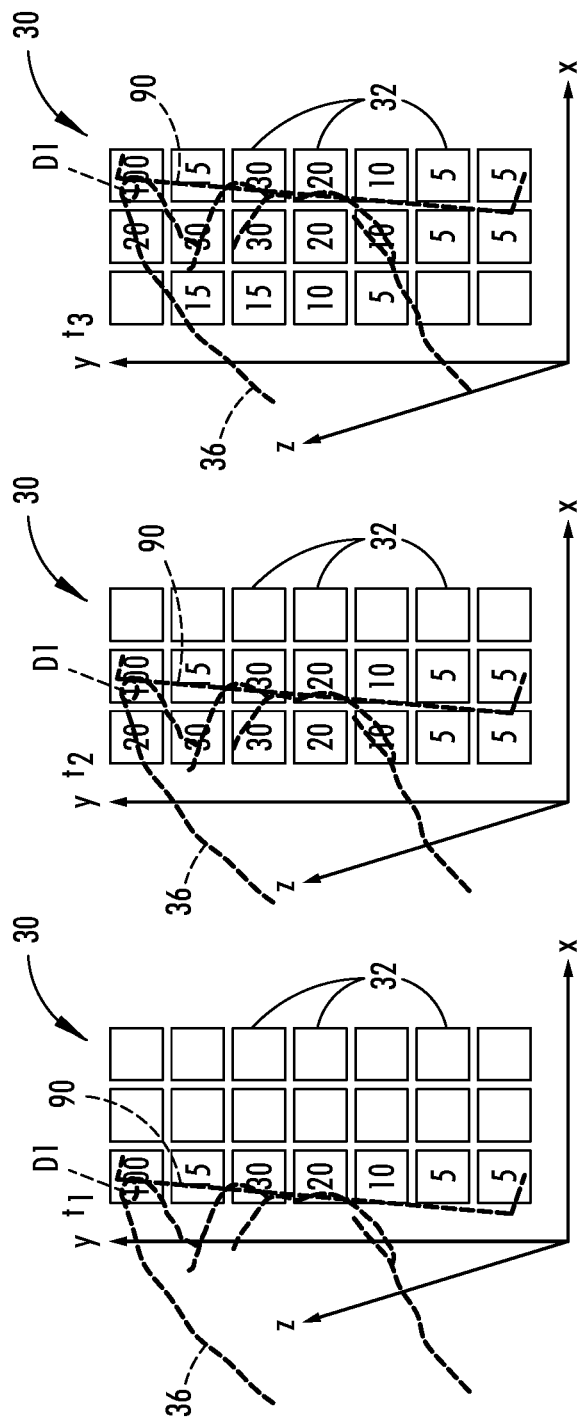

VEHICLE USER INPUT CONTROL SYSTEM AND METHOD

FIELD OF THE INVENTION

The present invention generally relates to user input control, and more particularly relates to controlling the functionality made available to users of a user input device in a vehicle.

BACKGROUND OF THE INVENTION

Passenger vehicles often are equipped with electronic devices or systems that include user interfaces that receive user inputs. For example, a vehicle may include a touchscreen interface that enables a user to input commands to operate one or more systems or functions on the vehicle, such as for the entertainment and navigation systems. Vehicle controls often limit the user interaction and thus, the information that may be input by users while driving in order to reduce driver distraction. It would be desirable to provide for an enhanced vehicle system that allows for user interaction of a user input, such as a touchscreen, by a passenger in the vehicle.

SUMMARY OF THE INVENTION

According to one aspect of the present invention, a vehicle user input control system is provided. The vehicle user control system includes a user input located on a vehicle and a plurality of proximity sensors located on at least one side of the user input. The vehicle user control system also includes a controller processing signals generated by the proximity sensors to detect at least one of a trajectory and orientation of a hand proximate to the user input and determining the hand is associated with one of a driver and passenger of the vehicle.

According to another aspect of the present invention, a vehicle user input control system is provided. The vehicle user input control system includes a user input located on a vehicle and a plurality of proximity sensors located proximate the user input. The vehicle user input control system also includes a controller processing signals generated by the proximity sensors to detect at least one of a trajectory and orientation of a hand proximate to the user input and determining the hand is associated with one of a driver and passenger of the vehicle.

According to a further aspect of the present invention, a method of determining a user input associated with a driver or passenger of a vehicle is provided. The method includes the steps of sensing a hand proximate to a user input on a vehicle with a plurality of proximity sensors, detecting at least one of a trajectory and orientation of the hand and determining the hand is associated with a driver or passenger of the vehicle based on the detected at least one of a trajectory and orientation.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIGS. 10A-10C are schematic diagrams illustrating movement of a hand proximate to the sensor arrangement at different times, according to one example;

FIG. 10D is a graph illustrating signals generated by the proximate sensors during the hand movement shown in FIGS. 10A-10C;

FIGS. 11A-11C are schematic diagrams illustrating sensor count values generated by the sensor arrangement during the hand motion shown in FIGS. 10A-10C;

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
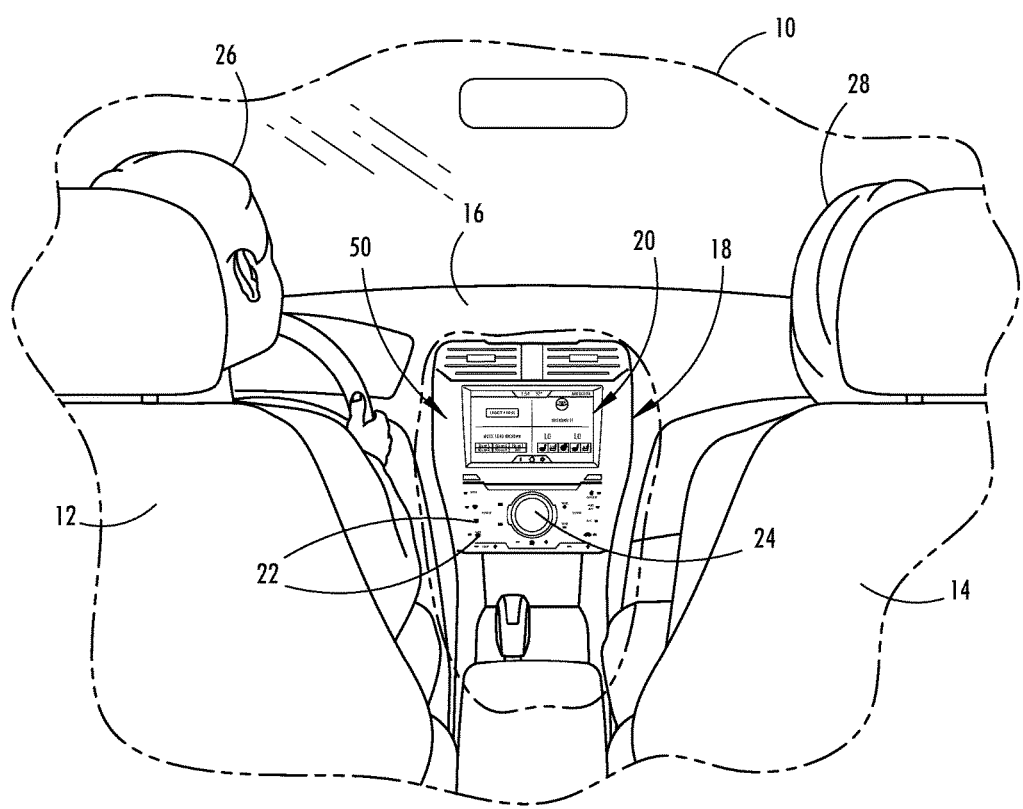
FIG. 1 is a perspective view of a user input control system having a touchscreen user input located between a driver and passenger in the passenger compartment of a vehicle.

Referring now to FIG. 1, a motor vehicle 10 is generally illustrated having a driver seat 12 and a passenger seat 14 generally located in the passenger compartment. The driver seat 12 is configured to seat a driver 26 of the vehicle, and passenger seat 14 is configured to seat a passenger of the vehicle seated to the right side of the driver. The vehicle 10 is shown having a user input in the form of a touchscreen 20 located in a center console 18 generally forward of the driver and passenger seats 12 and 14 and positioned within the instrument panel 16. The touchscreen 20 is a user input device that allows a user, such as the driver or passenger, to input commands via the touchscreen 20 to control one or more functions, such as the radio, navigation, volume control and other functions. In addition, other user inputs in the form of proximity switches 22 are shown located below the touchscreen 20 and a rotary input dial 24 is shown within the console 18. The driver 26 seated in the driver seat 12 or passenger 28 seated in the passenger seat 14 may operate the touchscreen 20 and other user input controls 22 and 24 by reaching forward with the user's hand to interface with the user inputs and enter input selections.

The vehicle 10 is further equipped with a user input control system 50 that senses a user's hand in close proximity to the user input touchscreen 20 and determines if the hand is associated with a driver seated in the driver seat or a passenger seated in the passenger seat 14 and controls one or more vehicle related functions to enable or disable certain functions based on the sensed hand. If the hand is determined to be the hand of a driver seated in the driver seat 12, certain input functions to the touchscreen 20 and other inputs may be limited in order to minimize distraction to the driver. If the hand is determined to be that of a passenger seated in the passenger seat 14, and not the driver, certain vehicle related functions may be enabled since it is presumed that such interaction would not be a distraction to the driver operating the vehicle 10. The control system 50 has a sensor arrangement that includes a plurality of proximity sensors located proximate to the user input touchscreen 20 and a controller that processes signals generated by the proximity sensors to detect at least one of a trajectory and orientation of a hand proximate to the user input and determines whether the hand is associated with either the driver or non-driver passenger.

Figure 2:
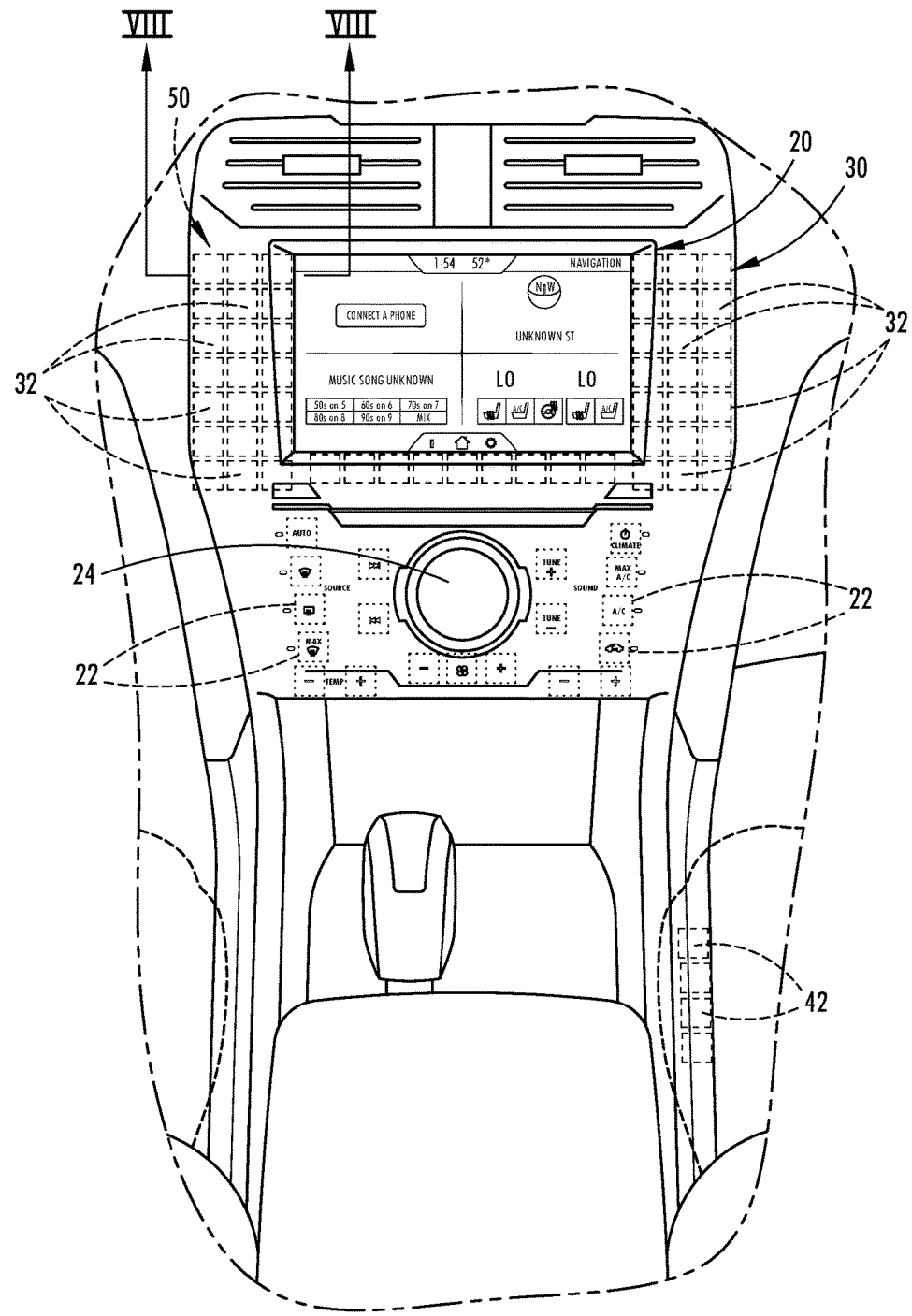
FIG. 2 is a schematic diagram illustrating the control system having the plurality of proximity sensors, according to one embodiment.

Referring to FIG. 2, the user input control system 50 is shown having a sensor arrangement 30 with a plurality of proximity sensors 32 located proximate to the touchscreen 20. In the sensor arrangement 30 shown, the proximity sensors 32 are located on both the left side and the right side of the touchscreen 20. In the embodiment shown, each of the left and right side proximity sensors includes a six by three (6×3) array of proximity sensors 32 located directly on each of the left and right sides of the touch screen 20. Additional proximity sensors 32 are shown located extending below the touch screen 20. The sensor arrangement 30 enables the control system 50 to detect the presence of a hand of a driver seated in the driver seat 12 or a passenger seated in the passenger seat 14 in close proximity to the touchscreen 20. The sensor arrangement 30 enables the control system to detect a trajectory of the hand as it moves from left to right or right to left and an orientation of the hand, and to determine whether the hand belongs to a driver seated in the driver seat 12 on the left side of the vehicle 10 or a passenger seated in the passenger seat 14 on the right side of the vehicle 10. It should be appreciated that for a vehicle having the driver seat 12 located on the right seat of the vehicle 10, the control system 50 may be configured to detect a driver on the right side and a passenger on the left side.

The proximity sensors 32 may include capacitive sensors, according to one embodiment. The capacitive sensors generate an electric field and detect the presence of a hand in close proximity to the sensor based on an interference caused by the conductive properties of the hand interfering with the electric field. It should be appreciated that other types of proximity sensors may be employed including inductive sensors, infrared sensors and ultrasonic sensors. In addition to the proximity sensors 32 which, according to one embodiment, are dedicated to sensing proximity of a hand relative to the touchscreen 20, other sensors may be employed. For example, proximity sensors 22, such as capacitive sensors, shown located below the touchscreen 20 may be employed to sense the trajectory and/or orientation of the hand. Sensors 22 may serve other functions, such as a sensor for a proximity switch, such as a capacitive switch that may serve one or more other functions on the vehicle such as inputs for vehicle functions including climate and audio controls. In addition to sensing position of a finger to activate a proximity switch, the proximity sensors 22 may sense the position of a hand positioned close to or moving across the sensors 22 to detect trajectory and orientation of the hand. Further, a one by four (1×4) array of knee sensing proximity sensors 42, such as capacitive sensors, are shown located in the center console proximate to an expected location of a knee of a passenger seated in the passenger seat 14 on the right side of the vehicle 10. The knee sensing proximity sensors 42 may detect the presence of a knee or leg of a passenger seated in the passenger seat 14. In addition, the vehicle 10 may be equipped with other occupant detection sensors for detecting the presence of a driver or passenger seated in one of the driver seat 12 and passenger seat 14. Occupancy detection sensors may include weight sensors positioned in the seats 12 and 14, infrared (IR) sensors and other types of proximity sensors for detecting the presence of a driver seated in the driver seat 12 and a passenger seated in the passenger seat 14.

Figure 2A:
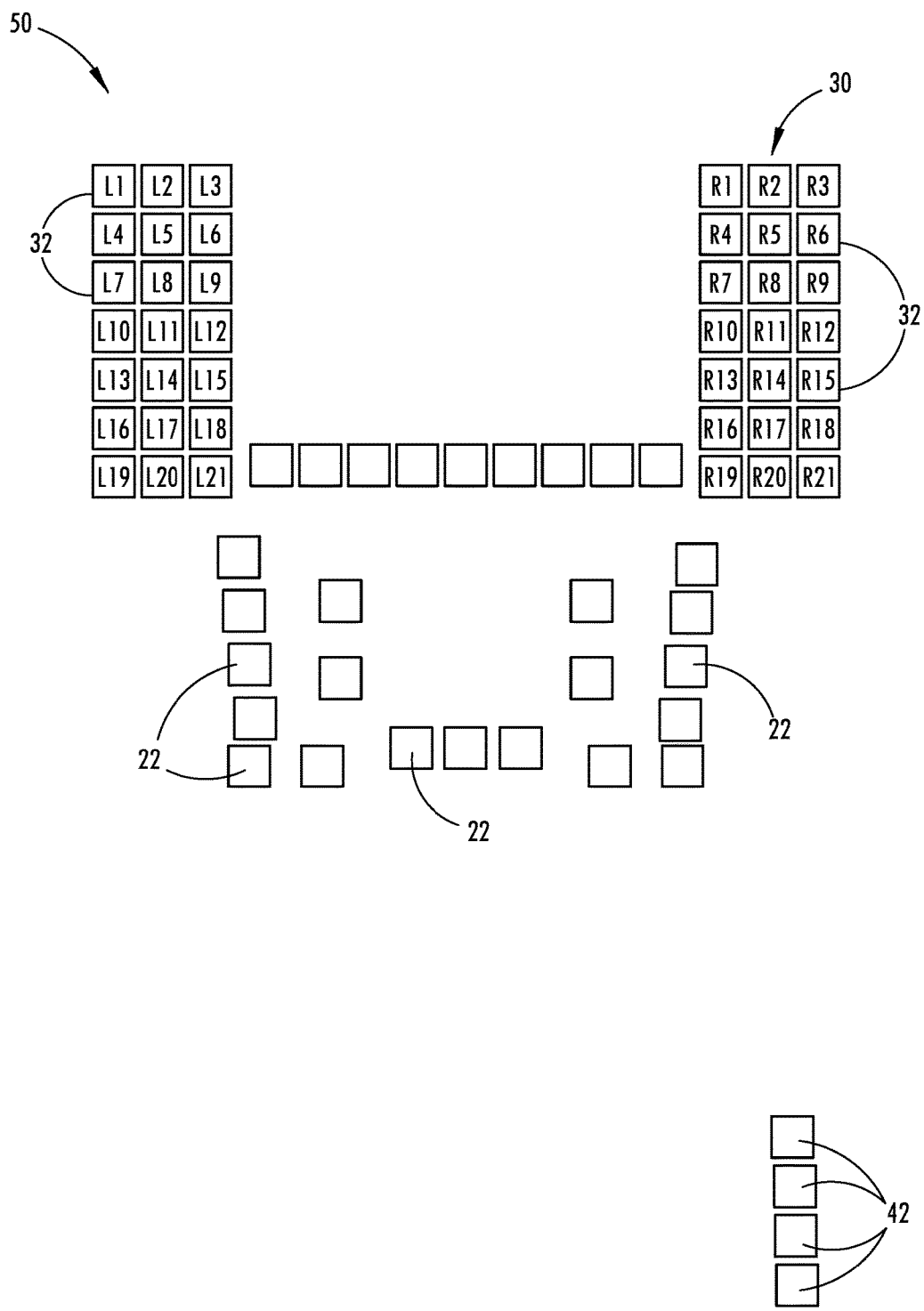
FIG. 2A is an enlarged view of the user input control system further illustrating proximity sensors for sensing a user input by either the driver or passenger of the vehicle.

The sensor arrangement 30 of control system 50 is further illustrated in FIG. 2A. The proximity sensors 32 located on the left side of the touchscreen 20 are labeled L1-L21. The proximity sensors 32 located on the right side of the touchscreen are labeled R1-R21. By processing signals generated by the proximity sensors 32, the control system 50 is able to determine the trajectory and orientation of a hand interfacing with the touchscreen 20. For example, as a driver of the vehicle moves his or her hand from left to right or as the passenger moves his or her hand from right to left, the signals generated by the proximity sensors 32 may be processed to determine if the hand belongs to a driver or passenger of the vehicle. Similarly, the orientation of the hand may be determined by processing the signals generated by the proximity sensors 32. The orientation may be determined by the rotation of the hand and positioning of the fingers of the hand as the passenger or driver interfaces with the touchscreen 20. Typically, a driver or passenger will interface with the touchscreen with a digit, such as the index finger D1 adjacent to the thumb, and the hand will typically be rotated in a clockwise manner for a driver seated on the left side or in a counter-clockwise rotation for a passenger seated on the right side. In this seating arrangement, the driver's hand will typically have the index finger D1 on top and the thumb on the left and remaining fingers on the right and tilted downward. The passenger's hand will typically have the index finger D1 on top with the thumb on the right and the remaining fingers on the left and tilted downward. By comparing the signals to known signal waveforms, the trajectory and orientation of the hand, and thus the hand belonging either to a driver or a passenger may be determined. If the passenger seated in the passenger seat 14 is determined to be interfacing with the touchscreen 20, the control system may enable further functionality or control options available with the touchscreen 20, whereas if the driver is detected interfacing with the touchscreen 10, certain functions may be disabled.

Figure 3:
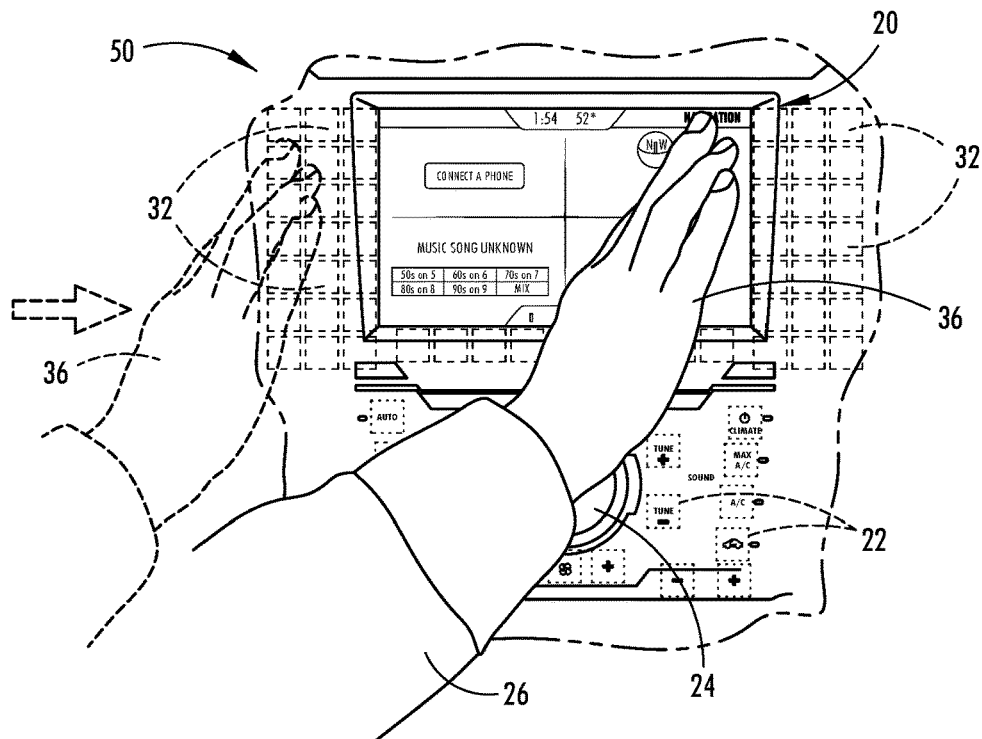
FIG. 3 is a perspective view of the user input control system further illustrating a driver on the left side interfacing with the touchscreen.

Referring to FIG. 3, one example of a driver 26 of the vehicle 10 seated in the driver seat 12 on the left side and interfacing via the driver's hand 36 with the touchscreen 20 is illustrated. In this example, the driver's hand 26 moves toward the touchscreen 20 from the left side moving towards the right side. As the hand 36 moves from the left side towards the right side, the hand 36 passes over and in close proximity to the proximity sensors 32 on the left side of the touchscreen 20. The proximity sensors 32 on the left side of the touchscreen may be processed to determine the trajectory of the hand is a left to right motion and therefore likely to be the driver of the vehicle interfacing with the touchscreen 20.

Figure 4:
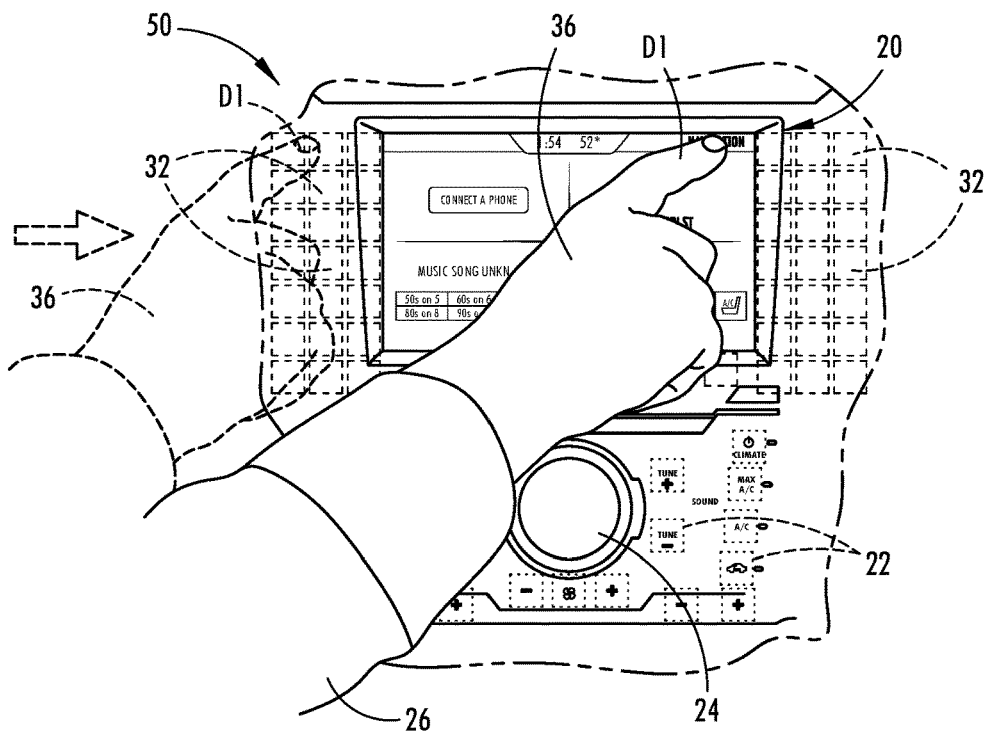
FIG. 4 is a perspective view of the user input control system further illustrating the driver interfacing with the touchscreen.

Referring to FIG. 4, the driver 26 is shown with the hand 36 interfacing with the touchscreen 20, according to another example. In this example, the hand 36 is shown with the index finger shown as digit D1 oriented in a certain orientation with the hand generally rotated relatively clockwise such that the index finger D1 is on top, the thumb is on the left, and the other digits of the hand are below tilted clockwise at an angle. The proximity sensors 32 generate sensed signals indicative of a sensed object. The sensed signals from the sensor arrangement may map out the orientation of the hand 36 such that the controller may process the sensed signals to determine if the hand 36 is rotated clockwise and thus, likely to be the driver of the vehicle interfacing with the touchscreen 20. The controller may process both the trajectory and orientation decisions or may process one of the trajectory and orientation decisions to determine whether the hand is likely that of a driver or a passenger of the vehicle.

Figure 5:
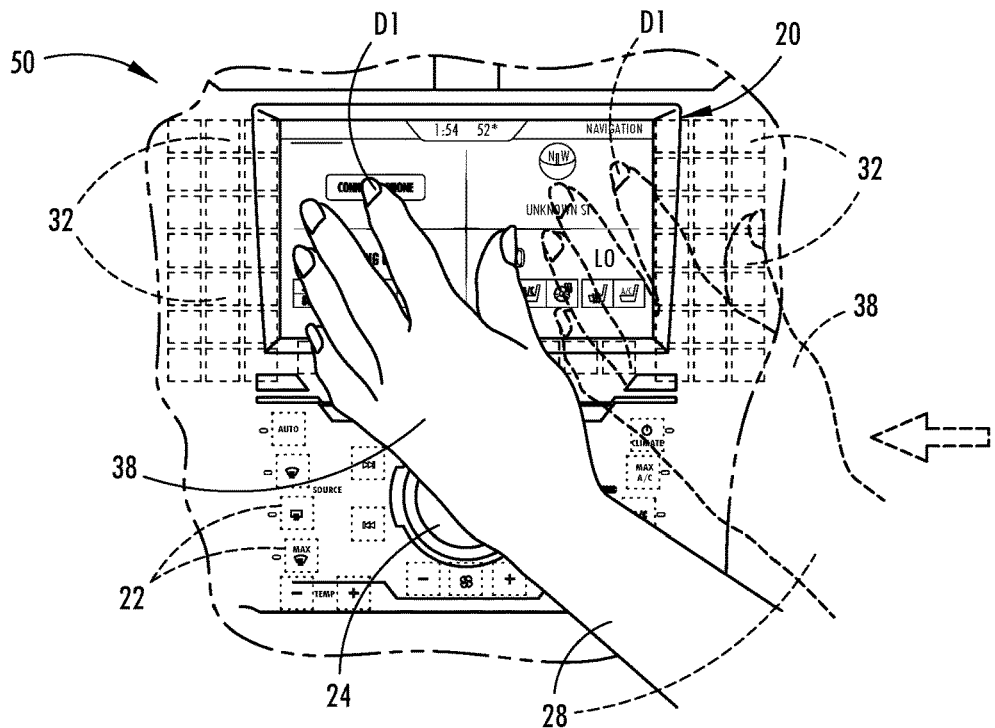
FIG. 5 is a perspective view of the user input control system illustrating a passenger on the right side interfacing with the touchscreen.

Referring to FIG. 5, a passenger 28 seated in the passenger seat 14 on the right side is shown with the hand 38 interfacing with the touchscreen 20. In this example, the passenger hand 38 approaches the touchscreen 20 from the right side and moves towards the left side. The proximity sensors 32 on the right side of the touchscreen 20 may generate sensed signals which are processed to determine the trajectory of the hand 38 is a right to left motion and therefore likely to be a passenger interfacing with the touchscreen 20.

Figure 6:
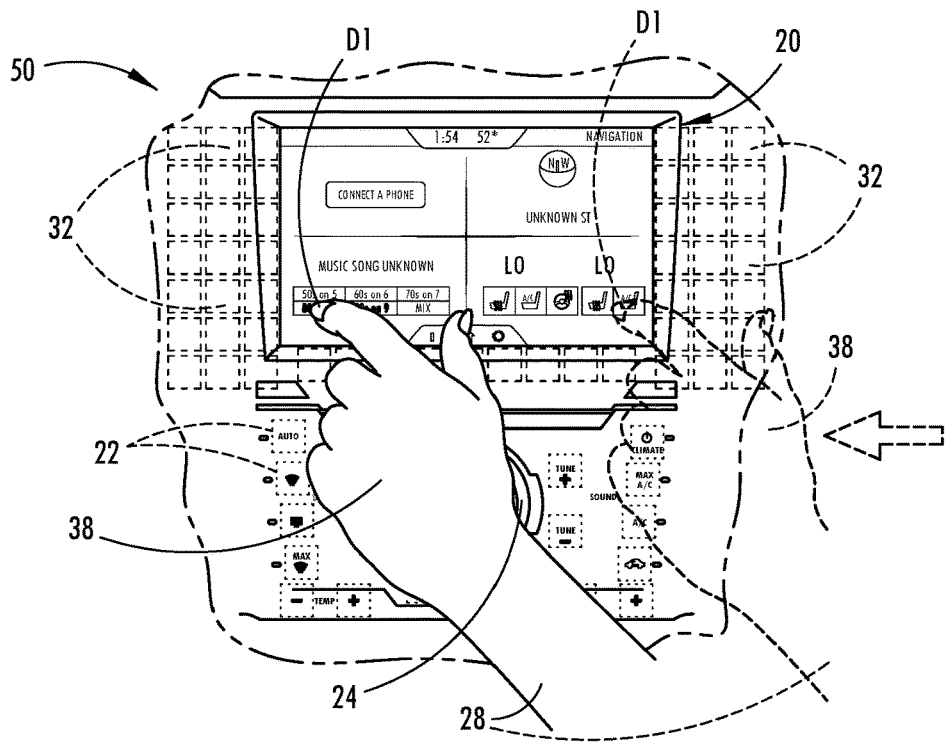
FIG. 6 is a perspective view of the user input control system further illustrating the passenger interfacing with the touchscreen.

Referring to FIG. 6, one example of the orientation of a hand of a passenger 28 is illustrated with the passenger's hand 38 interfacing with the touchscreen 20. The proximity sensors 32 on the right side of the touchscreen 20 generates signals that may be mapped out to determine the orientation of the hand 38 is in a slightly counter-clockwise direction such that the index finger D1 is on top with the thumb on the left and rest of the digits rotated downward at an angle in a counter-clockwise position. The controller may process the sensed signals generated by the proximity sensors 32 to determine the trajectory and/or orientation of the hand and thus, determine whether the hand is that belonging to a passenger of the vehicle.

Figure 7:
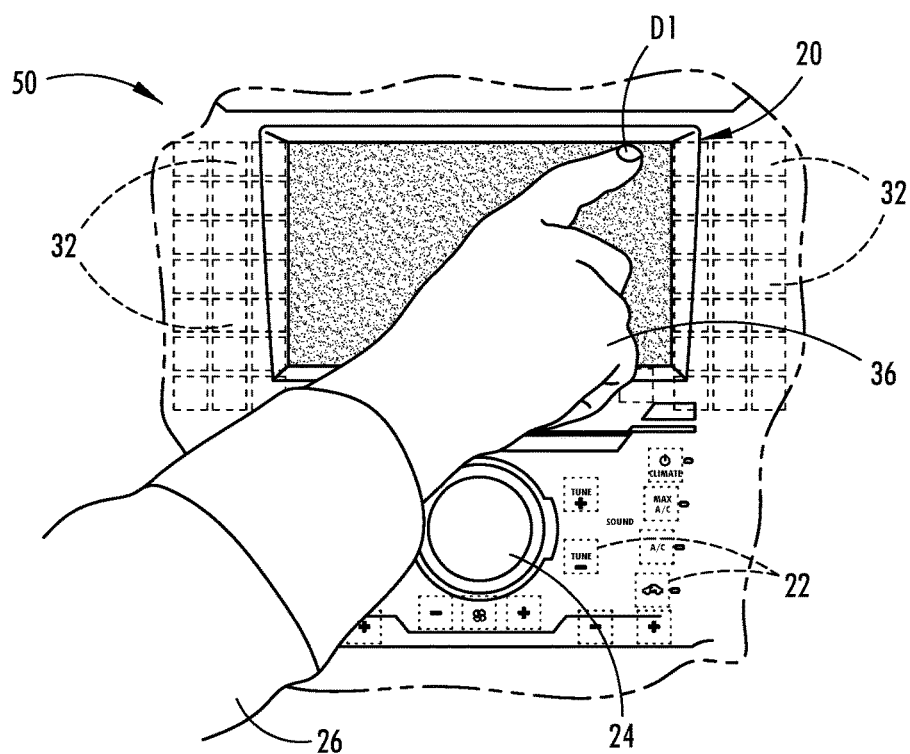
FIG. 7 is a perspective view of the user input control system further illustrating the driver entering a non-enabled input with the touchscreen and receiving a lockout warning.

Referring to FIG. 7, the touchscreen 20 is shown with the driver's hand 36 interfacing with the touchscreen 20. In this example, the hand 36 is determined to be that of a driver and the functionality that is requested by the driver input is disabled. As seen, when disabled, the touchscreen 20 may output a warning that certain functionality is not available when an input is attempted by the driver of the vehicle. The warning may include flashing the touchscreen or part of the screen red color light or blocking out the control function inputs to prevent or dissuade the driver input from occurring or being executed. It should be appreciated that other warning signals, such as audible signals and other visual signals or haptic signals may be employed as feedback indicative of a disabled function.

Figure 8:
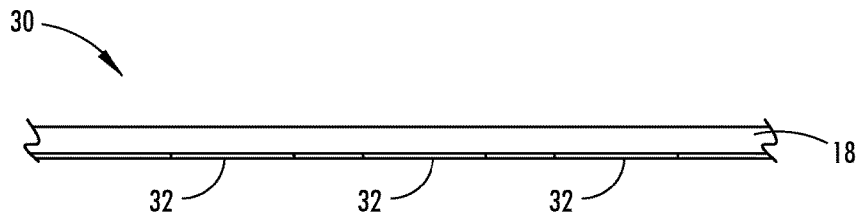
FIG. 8 is a cross-sectional view of the proximity sensors taken through line VIII-VIII of FIG. 2.

In FIG. 8, the proximity sensors 32 are generally shown according to one embodiment formed on the underside of the center console 18. As seen, the proximity sensors 32 may be capacitive sensors that are printed or assembled circuit traces or otherwise fabricated on the underside of the console 18. Proximity sensors 32 may include electrodes configured with interdigitated fingers that generate a capacitive field, as should be evident to those skilled in the art.

Figure 9:
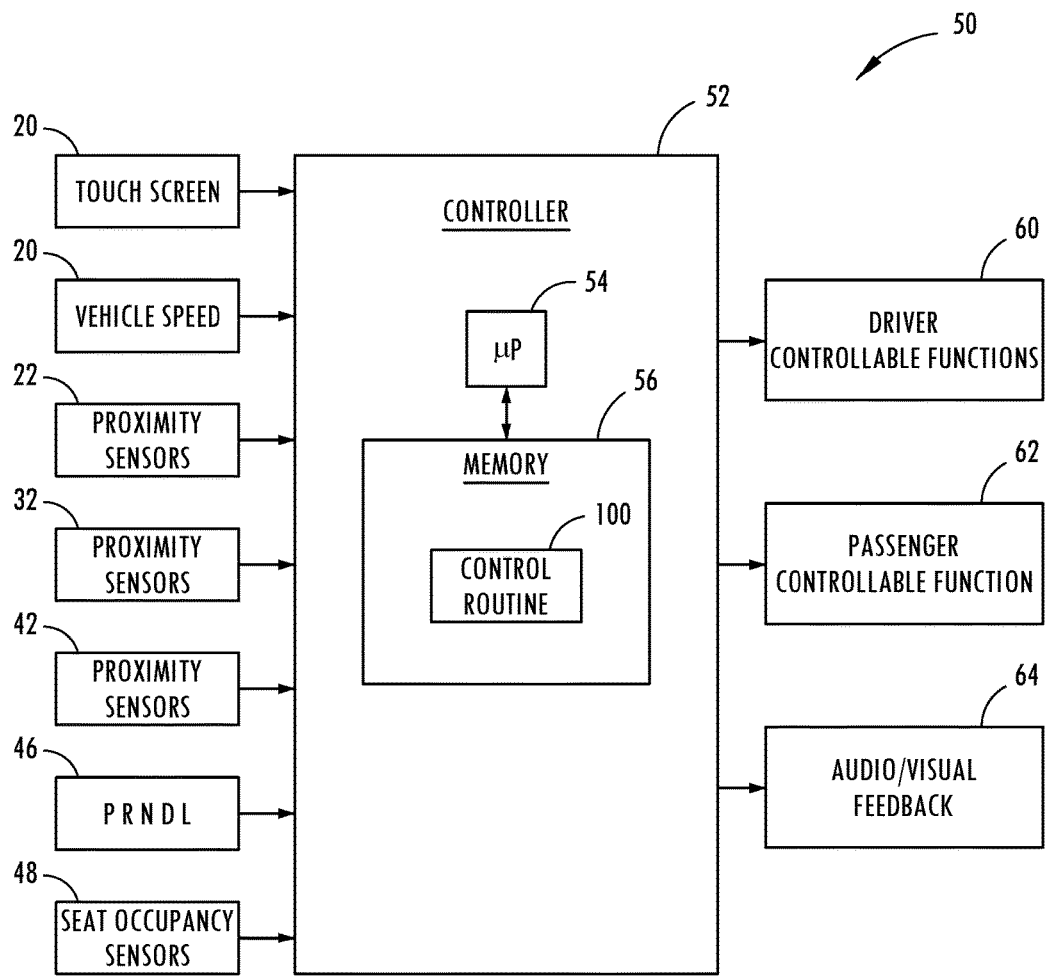
FIG. 9 is a block diagram of the user input control system illustrating a controller for controlling the system.

Referring to FIG. 9, the user input control system 50 is further illustrated having a controller 50 shown receiving various inputs and generating control outputs. The controller 50 is shown having a microprocessor 54 and memory 56. However, it should be appreciated that the controller 52 may include other analog and/or digital control circuitry. Stored within memory and executed by the microprocessor 54 is a control routine 100 that processes the various inputs and generates the outputs. The inputs to the controller 52 include the touchscreen inputs 20 which may include the functionality provided via input from a driver or passenger. Other inputs include the vehicle speed 44, the vehicle transmission position PRNDL 46, and the seat occupancy sensors 48. In addition, the proximity sensors 22, 32 and 42 are input to the controller 52. The controller 52 processes the various proximity sensors and other inputs and generates the driver controllable functions 60 and passenger controllable functions 62. The driver controllable functions 60 and passenger controllable functions 62 may be functions that pertain to certain systems made available on the vehicle that may be enabled or disabled based upon the determined operator of the user interface. In addition, the controller 52 may generate an output signal to audio and visual feedback 64 to provide warnings or other feedback such as when certain functions are enabled or disabled.

Referring to FIGS. 10A-11C, one example of the driver hand 36 moving in close proximity to the sensor arrangement 30 of the control system 50 is illustrated. The control system 50 detects the hand and its trajectory and orientation. In this example, the hand 36 of the driver is shown moving from the left side of the sensor arrangement 30 toward the right side as the driver of the vehicle interfaces with the touchscreen. Each of the proximity sensors 32 generates a signal 80 which may be a count value indicative of the sensed proximity or position of the hand 36 or a portion thereof relative to each sensor. The signals 80 generated by the proximity sensors 32 are shown in the graph of FIG. 10D and are further illustrated as count values in FIGS. 11A-11C, according to one example. Each proximity sensor 32 has an associated x, y, z coordinate where the z coordinate is estimated from a sensor signal and is based on distance generally between the proximity sensor and the hand 36 or a digit or portion thereof. A regression line 90 may be generated at each time period to identify a line and space of the hand that best fits or matches the sensed data. The orientation of the regression line 90 may be indicative of a signature that maps the position of the hand 36 in space. By calculating the regression line 90 for a sequence of time intervals, the motion of the hand 36 in space can be determined. As such, a left to right trajectory of the hand 36 may be detected which is indicative of the driver of the vehicle. In addition, the regression line 90 having an angle tilted clockwise relative to the vertical may be indicative of an orientation of a driver's hand.

As shown in FIG. 10D, as the hand 36 passes from the left side to the right of the sensor arrangement 30, the proximity sensor arrangement senses the index finger of D1 of hand 36 on the sensor labeled L1 at time $t_1$. The index finger D1 is close to the sensor L1 as the operator intends to move the index finger very close to the sensor arrangement 30. The remainder of the hand 36 is generally further removed at a distance on the Z-axis from the sensor arrangement. As the hand progresses towards the right at time $t_2$, the index finger D1 moves to sensor D2 and the hand 36 comes into close contact with other sensors on the left side of the sensor arrangement. The hand 36 may further progress to sensor L3 as shown at time t3 in FIG. 10C. The signals generated by the sensors L1-L21 are shown in FIG. 10D at time periods $t_1$, $t_2$ and $t_3$ which correspond to the hand positions in FIGS. 10A-10C. The signals that are not shown in FIG. 10D may be assumed to have a small or zero count value indicative of no or little sensing of the hand.

It should be appreciated that the proximity sensors labeled R1-R21 on the right side of the touchscreen 20 may likewise be used to detect trajectory and orientation of the hand in a similar manner. It should further be appreciated that both the right side and left side sensors may detect trajectory and orientation of either a driver or passenger hand.

Figure 12:
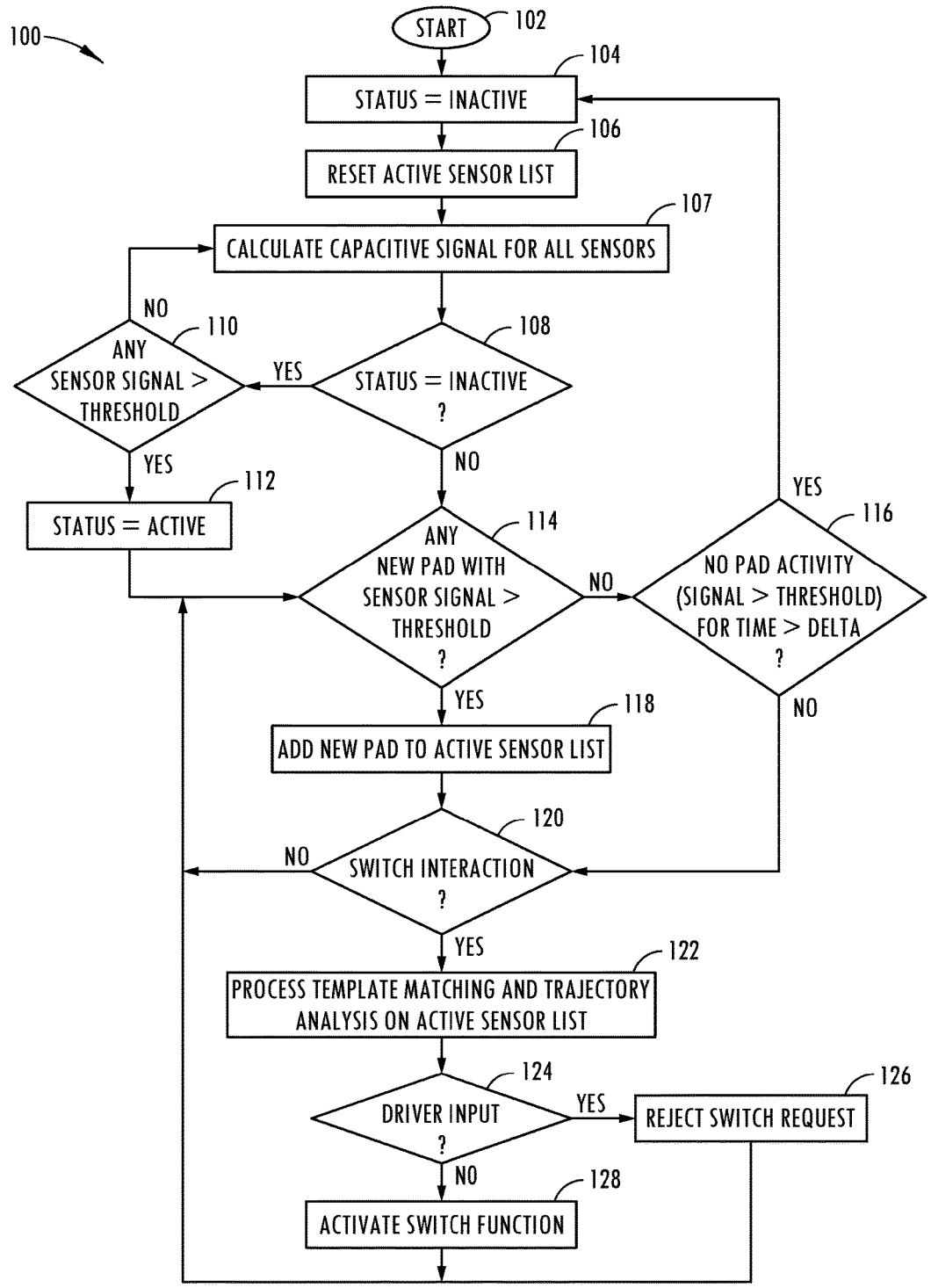
FIG. 12 is a flow diagram illustrating a control routine for processing the proximity sensors and determining user interface with the touchscreen, according to one embodiment.

Referring to FIG. 12, the control routine 100 for processing the proximity sensor signals and determining the user interfacing with the touchscreen is shown, according to one embodiment. Routine 100 begins at step 102 and proceeds to step 104 to set the status to inactive and then to step 106 to reset the active sensor list. Next, at step 107, routine 100 calculates the capacitive signal for all active sensors. Thereafter, at decision step 108, routine 100 determines if the status is inactive and, if so, proceeds to decision step 110 to determine if any sensor signal is greater than a threshold and, if not, returns to step 107. If any sensor signal is greater than the threshold, routine 100 proceeds to step 112 to set the status to active before preceding to decision step 114.

Next, at decision step 114, routine 100 determines if any new proximity sensor input pad has a sensor signal greater than a threshold and, if not, proceeds to decision step 116 to determine if there is no proximity sensor input pad activity for a time period greater than delta and, if so, returns to step 104. If there is proximity sensor input pad activity for a time period of delta, then routine 100 proceeds to decision step 120. If there is any new sensor input pad with a sensor signal greater than a threshold, routine 100 proceeds to step 118 to add the new sensor input pad to the active sensor list, and then proceeds to decision step 120.

At decision step 120, routine 100 determines if there is a switch or sensor interaction and, if not, returns to step 114. If there is a switch or sensor interaction, routine 100 proceeds to step 122 to perform process template matching and trajectory analysis on the active sensor list. This step may be performed according to the routine 122 shown in FIG. 13. Thereafter, routine 100 determines if the input is a driver input at decision step 124. If the input is a driver input, routine 100 will reject the switch input request at step 126 to limit functionality made available to the driver of the vehicle. If the input is not a driver input, routine 100 will proceed to step 128 to activate the switch input function, thereby enabling the functionality without limitation.

Figure 13:
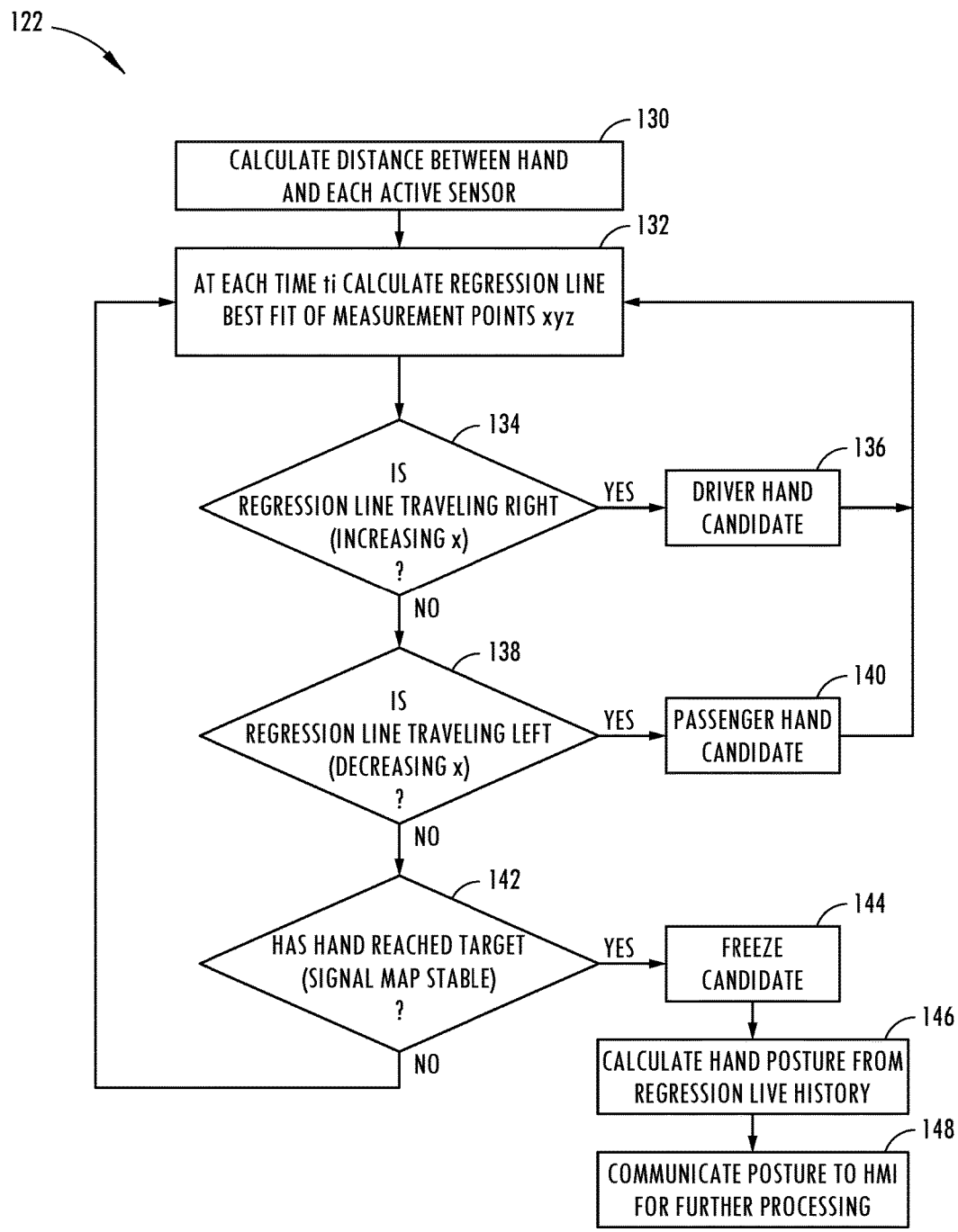
FIG. 13 is a flow diagram illustrating a routine for processing template matching and trajectory analysis on the sensor signals.

Routine 122 of processing the template matching and trajectory analysis on the active sensor list is illustrated in more detail in FIG. 13. Routine 122 includes step 130 of calculating the distance between the hand and each active sensor. Next, at step 132, at each time ti routine 122 calculates a regression line that best fits the measurement points x, y, z. Proceeding to decision step 134, routine 122 determines whether the regression line is traveling towards the right and thereby increasing and, if so, proceeds to step 136 to determine that the hand is a driver hand candidate, before returning to step 132. If the regression line is not traveling to the right step 132 proceeds to decision step 138 to determine if the regression line is traveling towards the left and thereby decreasing. If the regression line is traveling left and is thereby decreasing, step 132 proceeds to step 140 to determine that the hand is a passenger hand candidate, before returning at step 132. If the regression line is not traveling left, decision step 142 determines if the hand has reached the target such that the signal map is stable at step 142. If the hand has reached the target and the signal map is stable, step 122 proceeds to step 144 to freeze the candidate, then to step 146 to calculate the hand posture from the regression line history, and then step 146 to communicate the hand posture to the HMI for further processing.

The vehicle user input control system advantageously senses the trajectory and/or orientation of a hand attempting to enter an input to the user input and determines whether the hand is a driver hand or passenger hand. This enables certain functionality to be enabled or disabled depending on whether the input is from the driver or passenger. As such, driver distraction can be reduced.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle user input control system comprising:
a user input device located on a vehicle;
a plurality of proximity sensors arranged in a plurality of rows and columns and located on at least one side of the user input device; and
a controller processing signals generated by the proximity sensors to detect at least one of a trajectory of a hand based on movement and orientation of the hand based on signal patterns generated by the proximity sensors proximate to the user input device, determining the hand is associated with one of a driver and passenger of the vehicle based on the detected at least one of the trajectory and orientation of the hand, and controlling at least one function based on the hand being determined as a driver or passenger.

2. The system of claim 1, wherein the controller limits at least one function when the controller determines the hand is associated with a driver.

3. The system of claim 1, wherein the controller determines the hand is associated with one of a driver and passenger of the vehicle based on a trajectory of the hand moving relative to the plurality of proximity sensors.

4. The system of claim 1, wherein the controller determines the hand is associated with one of a driver and passenger of the vehicle based on the trajectory and the orientation of the hand moving relative to the plurality of proximity sensors.

5. The system of claim 1, wherein the controller determines the orientation of the hand based on the signals compared to known signal patterns.

6. The system of claim 1, wherein the plurality of proximity sensors are located on opposite left and right sides of the user input.

7. The system of claim 1, wherein the user input device comprises a touchscreen.

8. The system of claim 1, wherein the plurality of proximity sensors comprises a plurality of capacitive sensors.

9. A vehicle user input control system comprising:
a user input device located on a vehicle;
a plurality of proximity sensors arranged in a plurality of rows and columns and located proximate the user input device; and a controller processing signals generated by the proximity sensors to detect at least one of a trajectory of a hand based on movement and orientation of the hand based on signal patterns of digits of the hand generated by the proximity sensors proximate to the user input device, determining the hand is associated with one of a driver and passenger of the vehicle based on at least one of the detected trajectory and orientation of the hand, and controlling at least one function based on the hand being determined as a driver or passenger.

10. The system of claim 9, wherein the controller limits at least one function when the controller determines the hand is associated with a driver.

11. The system of claim 9, wherein the controller determines the hand is associated with one of a driver and passenger of the vehicle based on a trajectory of the hand moving relative to the plurality of proximity sensors.

12. The system of claim 9, wherein the controller determines the hand is associated with one of a driver and passenger of the vehicle based on the trajectory and the orientation of the hand moving relative to the plurality of proximity sensors.

13. The system of claim 9, wherein the controller determines the orientation of the hand based on the signals compared to known signal patterns.

14. The system of claim 9, wherein the plurality of proximity sensors are located on opposite left and right sides of the user input device.

15. The system of claim 9, wherein the user input device comprises a touchscreen.

16. The system of claim 9, wherein the plurality of proximity sensors comprises a plurality of capacitive sensors.

17. A method of determining a user input associated with a driver or passenger of a vehicle, comprising:
sensing a hand proximate to a user input device on a vehicle with a plurality of proximity sensors arranged in a plurality of rows and columns on at least one side of the user input device;
detecting at least one of a trajectory of the hand based movement and orientation of the hand based on signal patterns generated by the proximity sensors;
determining the hand is associated with a driver or passenger of the vehicle based on the detected at least one of a trajectory and orientation; and
controlling at least one function based on the hand being determined as a driver or passenger.

* * * * *